May 4, 1943. B. P. POND 2,318,012
STOKER CONTROL
Filed Oct. 16, 1940 3 Sheets-Sheet 3

INVENTOR
Bertram P. Pond
BY George K. Fisher
ATTORNEY

Patented May 4, 1943

2,318,012

UNITED STATES PATENT OFFICE 2,318,012

STOKER CONTROL

Bertram P. Pond, River Forest, Ill., assignor to Minneapolis-Honeywell Regulator Company, Minneapolis, Minn., a corporation of Delaware Application October 16, 1940, Serial No. 361,427

14 Claims. (Cl. 236—9)

My invention relates to automatic controls for fuel burning apparatus and is particularly concerned with controls embodying a combustion responsive device for automatically operating stokers to maintain fire under low heat requirement conditions.

In the past, efforts have been made to control stokers by means of temperature responsive devices having a temperature responsive element exposed to stack temperature or temperature in the combustion chamber itself, it being recognized that fundamentally the proper way to control a stoker for fire maintaining purposes is from the combustion temperature. Such devices, while simple and inexpensive have been found objectionable for various reasons, principally because of rapid deterioration of the temperature responsive element caused by heat.

My invention comprehends the employment of an element having variable electrical resistance exposed to temperature in the combustion chamber of a fuel burning system such as a stoker system, the resistance of the element varying with combustion temperature.

The variable resistance element preferably controls a heat responsive switching device controlling the stoker, the actuation of the switching device being governed by a current flow which is controlled by the resistance element, the resistance of which as pointed out depends on combustion temperature.

My improved control arrangement as will readily be appreciated eliminates the need of timing mechanisms such as frequently employed in the control of stokers, and avoids the use of temperature responsive elements which are subject to rapid deterioration when exposed to heat. The particular combination of a variable electrical resistance element and a heat actuated device is noteworthy in that relay coils are avoided, their use having the drawback that there is considerable heating of the coils which varies their resistance.

The primary object of my invention is to provide a control arrangement for controlling fuel burning apparatus, principally stokers, utilizing mechanism not dependent on timers and not subject to the drawbacks inherent in ordinary devices such as temperatures responsive switches when exposed to high temperatures.

Another object is to provide a stoker controlling arrangement comprising a variable resistance element exposed to combustion temperature in combination with means responsive to the variation in resistance of the element.

Another object is to provide a control arrangement for a fuel feeding device comprising a variable resistance element exposed to combustion temperature in combination with a heat actuated device responsive to variations in resistance of the element.

Another object is to provide an arrangement as set forth in the foregoing object wherein an auxiliary heater is utilized in combination with the heat actuated device to produce a heat anticipating effect, that is to cause the device to stop the stoker sooner than it normally would.

Another object is to provide an arrangement as set forth in the foregoing objects wherein an accumulating heater controlled by a space thermostat is used in combination with the heat actuated device to temporarily raise the setting of the fire maintaining apparatus to cause the stoker to operate at intervals during the drop in temperature after the thermostat is satisfied, it being recognized that this operation improves the efficiency.

Another object is to provide an arrangement as set forth in the foregoing objects wherein the variable resistance element and device controlled thereby form legs of a bridge circuit.

Another object is to provide a bridge circuit arrangement having legs comprising heat responsive expansible and contractible elements opposing each other and actuating contacts depending upon the relative energization of the elements, the relative energization of same being controlled by a combustion temperature responsive resistance element.

Another object is to provide means in the arrangement of the foregoing object whereby a heat anticipating effect is produced when the stoker is turned on.

Another object is to provide means controlled by the variable resistance element for shutting off the stoker in the event of no fire or high fire conditions. Many additional objects, advantages, and features of my invention will become apparent from the following detailed description and annexed drawings wherein.

Figure 1:
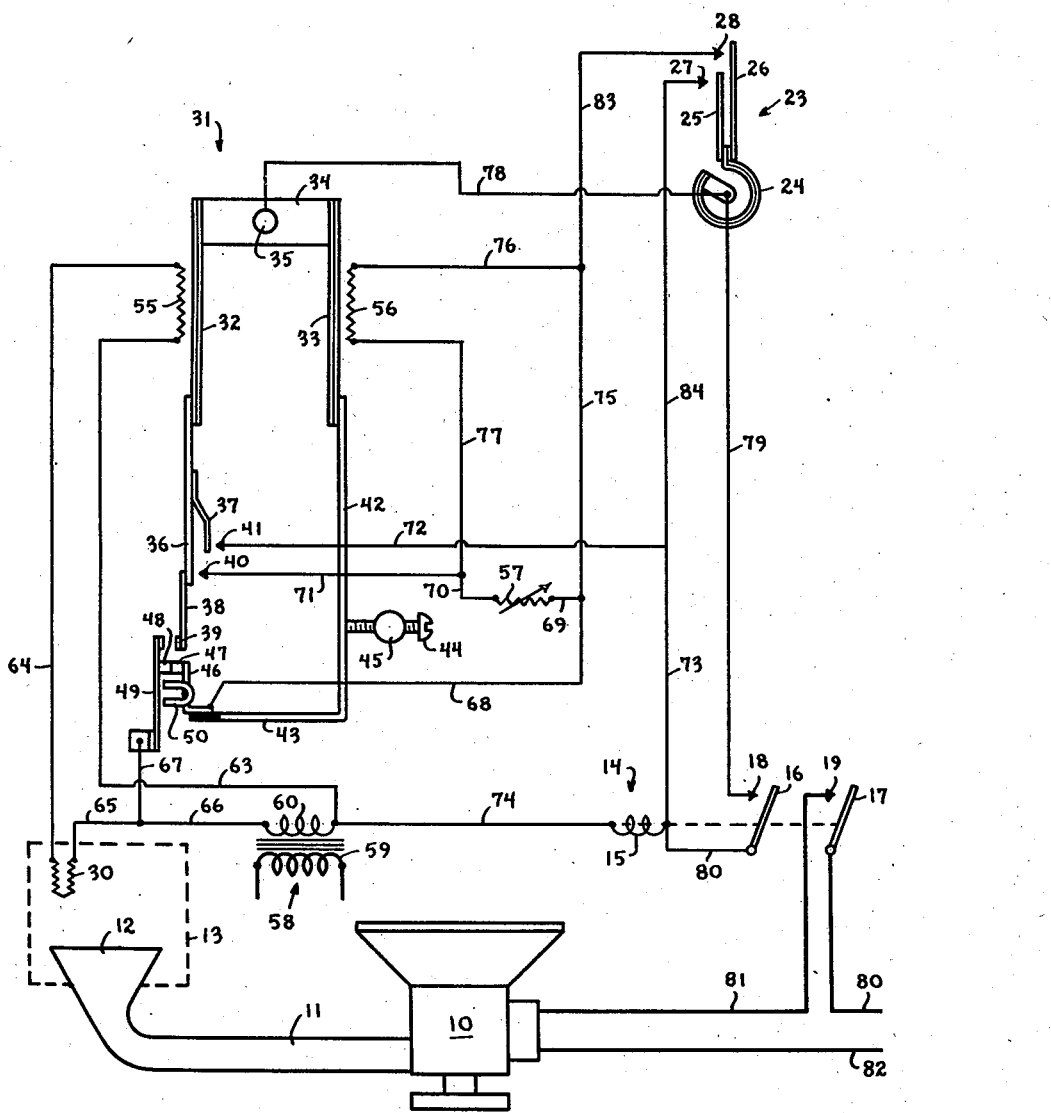
Figure 1 is a stoker system embodying a form of my invention.

Referring to Figure 1 of the drawings wherein I have shown a first form of my invention, numeral 10 represents a stoker of conventional type, the stoker being driven by an electric motor and having fuel feeding means 11 through which fuel is fed to a retort 12 disposed within a combustion chamber or space designated by the enclosure formed by the broken lines 13.

The control apparatus comprises a main relay 14 having a winding 15 with which is associated an armature which is attached to switch blades 16 and 17 and which moves the switch blades to the left into engagement with fixed electrical contacts 18 and 19 respectively when the winding 15 is energized.

Numeral 23 represents a space thermostat of conventional type having a circular bimetal element 24 carrying movable switch blades 25 and 26 which cooperate with fixed electrical contacts 27 and 28 respectively. Thermostat 23 is of a known type wherein blade 26 engages its associated contact at a fixed temperature and blade 25 engages its contact at another fixed temperature which may be one or two degrees lower, for example, the blade 26 being flexible to permit successive engagement of the blades with their contacts. Upon a rise in temperature the blades disengage from their respective contacts successively in reverse order.

The element which controls the stoker under low heat requirement conditions to maintain the fire, that is when the thermostat 23 remains satisfied for long periods, is represented by the element 30 disposed at a suitable point within the combustion space 13. The element 30 in the preferred form of the invention is a suitable length of wire, the resistance of which varies dependently upon the temperature within the combustion space. The element 30 may be any of various forms of wire, the resistance of which varies with temperature. Preferably a type of wire is chosen having such characteristics that its resistance changes appreciably with relatively small changes in temperature.

The element 30 controls a heat actuated device, that is, a thermal relay designated by the numeral 31. The relay or heat actuated device 31 comprises two bimetal elements 32 and 33 both of which are attached to a pivoted member 34 which is pivoted on a pin 35, the bimetal elements extending downwardly from the member 34. The bimetal element 32 has attached to its lower end a contact strip 36 and carried by the strip 36 is another contact strip 37 and a bracket 38 which carries a block 39. The contact strips 36 and 37 cooperate with fixed electrical contacts 40 and 41 respectively. Fastened to the bimetal element 33 is a downwardly extending member 42 having an angular portion 43 extending to the left. The member 42 is normally in engagement with a screw 44 carried by a fixed member 45. The left end of portion 43 is insulated and carries a contact bracket 46 having a contact 47. Contact 47 cooperates with a contact 48 on a contact carrying bracket 49. The bracket 48 may be moved to the left by the heat actuated device so that its lower end engages the upper end of bracket 49 which extends above contact 48 as shown for separating the contacts 47 and 48 which are normally in engagement. Numeral 50 designates a permanent magnet which cooperates with the contact bracket 49 so as to tend to normally hold the contacts 47 and 48 in engagement and to cause them to operate with a snap action.

Adjacent the bimetal element 32 is a heating resistance 55 and adjacent the bimetal element 33 is a similar resistance 56. Heating of element 32 by resistance 55 tends to cause element 32 to warp in a direction moving strips 36 and 37 towards their respective fixed contacts. Heating of element 33 causes it to warp in a similar direction so that member 42 is urged more strongly against screw 44 so that when element 33 does warp, the pressure of member 42 against screw 44 rotates the heat actuated device as a whole about the pivot 35, that is, in a clockwise direction. Thus if the elements 32 and 33 both warp in response to ambient temperature, that is, if the lower end of each is moved to the right the strips 36 and 37 will remain in the same position relative to their associated contacts because as element 32 warps towards the contacts the heat actuated device as a whole will be moved in a counter-clockwise direction moving them a similar amount away from their contacts. The arrangement of the bimetal elements on a pivoted member therefore acts to compensate for ambient temperature, that is, ambient temperature has no effect on the control action of the device.

Numeral 57 designates a manually adjustable resistance connected in parallel with the heating resistance 56.

Power for the control apparatus is supplied by a step-down transformer 58 having a primary winding 59 and a secondary winding 60 having a fewer number of turns. The heating resistance 55 is at all times connected across the secondary 60 of transformer 58 and in series with the resistance element 30 by a circuit which is as follows: from secondary 60 through a wire 63, resistance 55, wire 64, element 30, wire 65, and wire 66 back to secondary 60. Inasmuch as the resistance of element 30 varies dependently upon the temperature within the combustion space 13, the amount of current which flows through the circuit just described and consequently the amount of heat given off by resistance 55 depends upon the temperature within combustion space 13. Consequently, the heat which is imparted to bimetal element 32 and the position of contact strips 36 and 37 depends upon the last mentioned temperature. As the temperature within the combustion space 13 decreases, the resistance of element 30 also decreases, it having a positive coefficient of resistance, and as it does so the amount of current flowing in the circuit above described increases so as to increase the heating of element 32, tending to move the strips 36 and 37 closer to their associated contacts. With the parts in the position shown, the space thermostat is satisfied and the fire is diminishing inasmuch as the stoker is not operating. If the space thermostat remains satisfied until the fire has diminished to such an extent that a predetermined low temperature is reached in the combustion space 13, the heat given off by resistance 55 will increase to such an extent as to cause bimetal element 32 to warp enough to bring contact strips 36 and 37 into engagement with contacts 40 and 41. Upon this occurring, a circuit is completed for relay 14 as follows: from secondary winding 60 through wire 66, wire 67, contact bracket 49, contacts 48 and 47, contact bracket 46, wire 68, wire 69, resistance 57, wire 70, wire 71, contact 40, contact strip 36, contact strip 37, wire 41, wire 72, wire 73, winding 15, and wire 74 back to secondary 60. When the last circuit is completed, it will be noted that an additional circuit is also completed in parallel with resistance 57 through the heating resistance 56, the parallel branch being from wire 68 through wire 75, wire 76, resistance 56, and wire 77 back to wire 71. The amount of current flowing through each of the two parallel branches will of course depend upon the adjustment of the manual resistance 57. Upon completion of the circuit described the relay 14 is energized and blades 16 and 17 are moved to the left into engagement with their associated contacts. Engagement of blade 16 with contact 18 completes a maintaining circuit for relay 14 as follows: from secondary 60 through wire 66, wire 67, contact bracket 49, contacts 48 and 47, contact bracket 46, wire 68, wire 69, variable resistance 57, wire 70 to wire 71 (or from wire 68 through the parallel branch including resistance 56 to wire 71), contact 40, contact strip 36, element 32, member 34, wire 78, wire 79, contact 18, switch blade 16, wire 80, winding 15, and wire 74 back to secondary 60. It will be noted that this last maintaining circuit is independent of the contact strip 37 and contact 41 so that after the relay 14 is energized it remains energized until contact strip 36 is moved away from contact 40. The contact strips 36 and 37 operate in sequence, the strip 36 first engaging contact 40 upon movement of element 32 to the right and the strip 37 then engaging contact 41, and the contacts being disengaged in reverse order upon movement of the element 32 to the left.

Upon movement of switch blade 17 into engagement with contact 19, a circuit for the stoker is completed from a line conductor 80 through switch blade 17, contact 19, wire 81, the stoker 10 back to line conductor 82. After the stoker has been thus energized it continues in operation until the temperature within the combustion space 13 has been raised to a predetermined value. As the stoker operates to feed fuel into the combustion space the temperature rises causing the resistance of element 30 to increase and thus to decrease the current flowing in heating resistance 55. Due to the reduced heating of element 32 it tends to warp to the left, that is, in a direction to move contact strips 36 and 37 away from their associated contacts. After a predetermined rise in temperature in the combustion space, the strips 36 and 37 would be thus separated from their associated contacts. The purpose of the heating resistance 56 is to hasten this separation, that is, to produce a heat anticipating effect so as to separate the strips 36 and 37 from their associated contacts sooner than they would be normally only as a result of the rise in temperature within the combustion space 13. Thus when relay 14 is energized and heating resistance 56 is energized the heating of element 33 causes its lower end to warp to the right moving member 42 more firmly against screw 44 so as to rotate the heat actuated device in a clockwise direction as described above, this action additionally tending to separate strips 36 and 37 from their associated contacts. Thus after the stoker has been in operation for a length of time and after there has been a rise in temperature in the combustion space 13, due to the reduced heating of element 32 and the heating of element 33, contact strips 36 and 37 will have moved away from their associated contacts so as to interrupt both the energizing circuit of relay 14 and the maintaining circuit and to deenergize the heater 56. The amount of heat anticipation provided by heater 56 may be adjusted by adjusting the manual resistance 57. The essential purpose of providing the heat anticipating effect is to prevent the fire maintaining operations of the stoker from being too long in the event that the heat actuated device might not respond quickly enough to the rise in temperature alone in the combustion space.

In the event either element 30 or resistance 55 should burn out or otherwise fail bimetal element 32 will of course not be heated and the heat actuated device 31 will take position with strips 36 and 37 spaced from their associated contacts. In other words the apparatus will fail safe.

From the foregoing it will be understood that as long as the space thermostat 23 remains satisfied the stoker will be intermittently operated in response to the element 30 so as to maintain a fire in the combustion space 13.

In the event that there should be a call for heat from the space thermostat 23 such that the blades 25 and 26 are brought into engagement with their associated contacts a circuit for relay 14 is completed as follows: from secondary winding 60 through wire 66, wire 67, contact bracket 49, contacts 47 and 48, contact bracket 46, wire 68, wire 75, wire 83, contact 28, blade 26, blade 25, contact 27, wire 84, wire 73, winding 15, and wire 74 back to secondary 60. Completion of this circuit energizes the relay 14 and upon engagement of blade 16 with contact 18 a maintaining circuit for the winding 15 is completed as follows: from secondary 60, through wire 66, wire 67, contact bracket 49, contacts 47 and 48, contact bracket 46, wire 68, wire 75, wire 83, contact 28, blade 26, element 24, wire 79, contact 18, blade 16, wire 80, winding 15, and wire 74 back to secondary winding 60. By reason of this maintaining circuit the relay remains energized until the space temperature rises to a high enough value to separate thermostatic blade 26 from contact 28. Engagement of blade 17 with contact 19 energizes the stoker as described above, the stoker of course operating as long the the relay is energized.

If during the time that the stoker is energized as a result of a call for heat by the space thermostat 23 the temperature within the combustion space 13 should rise to an unusually high value, the system may be shut down as a result of opening of contacts 47 and 48. Thus when the temperature affecting element 30 rises to a predetermined high value, its resistance will be reduced to such an extent as to cause the amount of heating at the resistance 55 to be so reduced that element 32 by reason of the reduced heating will warp to the left so as to bring arm 38 into engagement with contact bracket 49 so as to separate contacts 47 and 48. Disengagement of these contacts will interrupt the relay circuits above described, deenergizing the relay and stopping the stoker. Upon the ensuing reduction in temperature in the combustion space the contacts 47 and 48 may be reclosed as a result thereof, the stoker thus being cycled from the contacts 47 and 48 which form high fire or high limit contacts.

From the foregoing explanation of my invention those skilled in the art will appreciate its manifold advantages and its outstanding utility. By its use the temperature in the combustion space is directly measured for purposes of controlling the stoker to maintain the fire when heating is not required. The use of a sensitive calibrated temperature responsive device subject to rapid deterioration is avoided. Moreover, by use of the thermal relay the heating effect of the current through the control element 30 is utilized rather than this heat becoming objectionable such as might be the case when using relay coils or the like.

Figure 2:
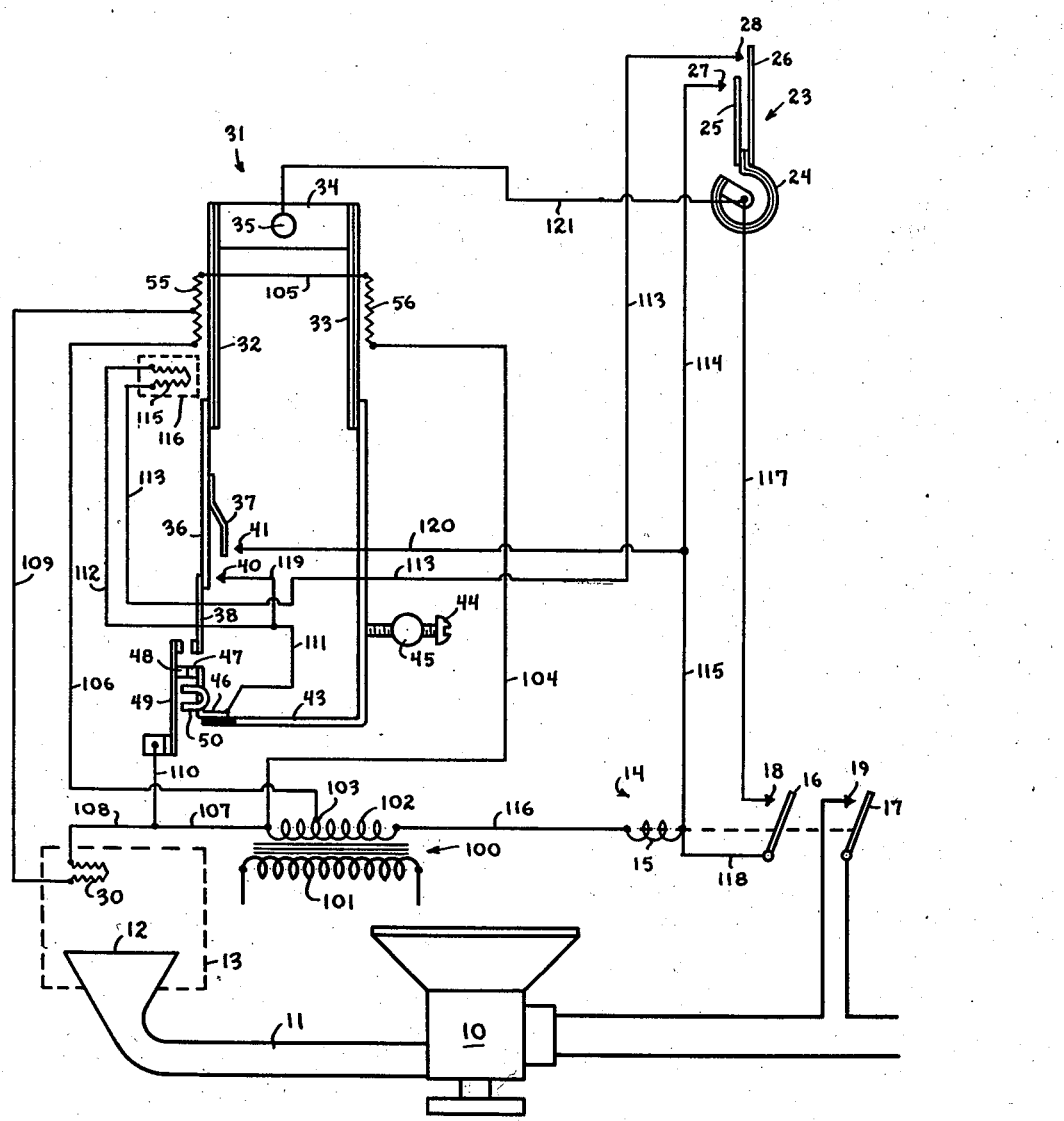
Figure 2 is a similar system embodying a second form of my invention.

Referring to Figure 2 of the drawings, I have shown a somewhat modified form of my invention. The form of Figure 2 however is similar in many respects to that of Figure 1 and like numerals refer to like elements in these two figures. In Figure 2, power for the control apparatus is supplied by a step-down transformer 100 having a primary winding 101 and a secondary winding 102, the secondary having a tap indicated by the numeral 103. In the present form of the invention there is no anticipating heater associated with the device 31 but instead the heating resistances 55 and 56 are connected in series across that portion of the secondary 102 to the left of the tap 103 by a circuit as follows: from the left end of secondary 102 through wire 104, resistance 56, wire 105, resistance 55 and wire 106 back to tap 103. Inasmuch as the resistances 55 and 56 are at all times connected in series across the power source any variations in current will equally affect the two heaters so that such variations will be compensated for in the same manner as ambient temperature is compensated for. The element 30 is connected in series with the lower half of resistance 55 across the left portion of secondary 102 by a circuit as follows: from the left end of secondary 102 through wire 107, wire 108, element 30, wire 109, the lower half of resistance 55, and wire 106 back to tap 103. By reason of the tap transformer 100, reduced power is used for the operation of the heat actuated device and thus the life of the element 30 and the heating resistances is prolonged. The element 30 controls the amount of heating at the lower half of resistance 55 and thus the bimetal element 32 operates the contacts associated therewith to control the relay and stoker in the same manner as in the previous embodiment.

In the present embodiment of the invention an additional heating resistance 115 is associated with the element 32 of the device 31. The resistance 115 forms what may be called an accumulating heater and if desired may be located within a heat insulating enclosure 116 adjacent the element 32. The heating resistance 115 is energized whenever the heater is energized by the space thermostat 23 and accumulates heat depending upon the length of time and the frequency that the space themostat calls for heat. The purpose of the heat supplied by resistance 115 is to temporarily raise the control point of the fire maintaining mechanism, that is, the heat actuated device 31. In other words, the heat supplied by the resistance 115 will affect the element 32 causing it to assume a position wherein strips 36 and 37 are closer to their associated contacts than they are when resistance 115 is cold. Accordingly when element 32 is thus heated by resistance 115 less heat will be required from resistance 55 to cause strips 36 and 37 to engage contacts 40 and 41 than normally. In other words, the element 30 will cause operation of the stoker at higher temperatures than normally depending upon the amount of heat which resistance 115 imparts to the element 32. Thus after the space thermostat becomes satisfied the stoker will be intermittently operated during the drop in combustion temperature while it is falling to the temperature corresponding to the normal control point of the fire maintaining apparatus, that is, the stoker will be operated by the fire maintaining apparatus at relatively higher temperatures in the combustion chamber until the resistance 115 has cooled. The intermittent operation of the stoker during the drop in temperature after the thermostat is satisfied promotes efficiency inasmuch as it causes fuel to be supplied at intervals to the central part of the fire thus preventing the fire from burning out first at the center, leaving a ring of unburned fuel around the outer portions of the retort. Thus when the thermostat 23 demands heat a circuit is completed for the relay 14 as follows: from secondary 102, through wire 107, wire 110, contact bracket 49, contacts 47 and 48, contact bracket 46, wire 111, wire 112, heating resistance 115, wire 113, contact 28, blade 26, blade 25, contact 27, wire 114, wire 115, winding 15, wire 116, back to secondary 102. Energization of relay 14 moves blades 16 and 17 to the left into engagement with their associated contacts and engagement of blade 16 with contact 18 completes a maintaining circuit for relay 14 as follows: from secondary 102 through wire 107, wire 110, contact bracket 49, contacts 47 and 48, contact bracket 46, wire 111, wire 112, heating resistance 115, wire 113, contact 28, blade 26, thermostatic element 24, wire 117, contact 18, blade 16, wire 118, winding 15 and wire 116 back to secondary 102. Thus it will be seen that whenever the relay 14 is energized by the thermostat 23 the heating resistance 115 is energized. When the thermostat 23 becomes satisfied the heater 115 is also deenergized but due to the heat which has accumulated the device 31 is subject to more heat than normal and thus its control point is temporarily raised and as pointed out above the fire maintaining operations will occur at higher than normal temperatures in the combustion space and the stoker will be intermittently operated at progressively lower combustion chamber temperatures as the combustion chamber temperature falls. Eventually, however, the heater 115 will completely cool and the fire maintaining apparatus will operate at its normal control point to maintain the desired temperature within the combustion space 13. The circuits by which the relay is energized for fire maintaining purposes may be traced as follows: from secondary 102, through wire 107, wire 110, contact bracket 49, contacts 47 and 48, contact bracket 46, wire 111, wire 119, contact 40, contact strip 36, contact strip 37, contact 41, wire 120, wire 115, winding 15, and wire 116 back to secondary 102. The maintaining circuit may be traced as follows: from secondary 102 through wire 107, wire 110, contact bracket 49, contacts 47 and 48, contact bracket 46, wire 111, wire 119, contact 40, contact strip 36, element 32, member 34, wire 121, wire 117, contact 18, switch blade 16, wire 118, winding 15, and wire 116 back to secondary 102.

The advantages of the present embodiment lie in that the circuit arrangements of the heaters associated with the device 31 provide for compensation for current variations and prolong the life of the parts used. By use of the additional heating resistance 115 more efficient operation is secured with very few and inexpensive additional parts. As in the embodiment of Figure 1, the apparatus will fail safe in the event of burnout or failure of element 30 or resistances 55 and 56, bimetal element 32 when cool assuming a position with strips 36 and 37 spaced from contacts 40 and 41.

Figure 3:
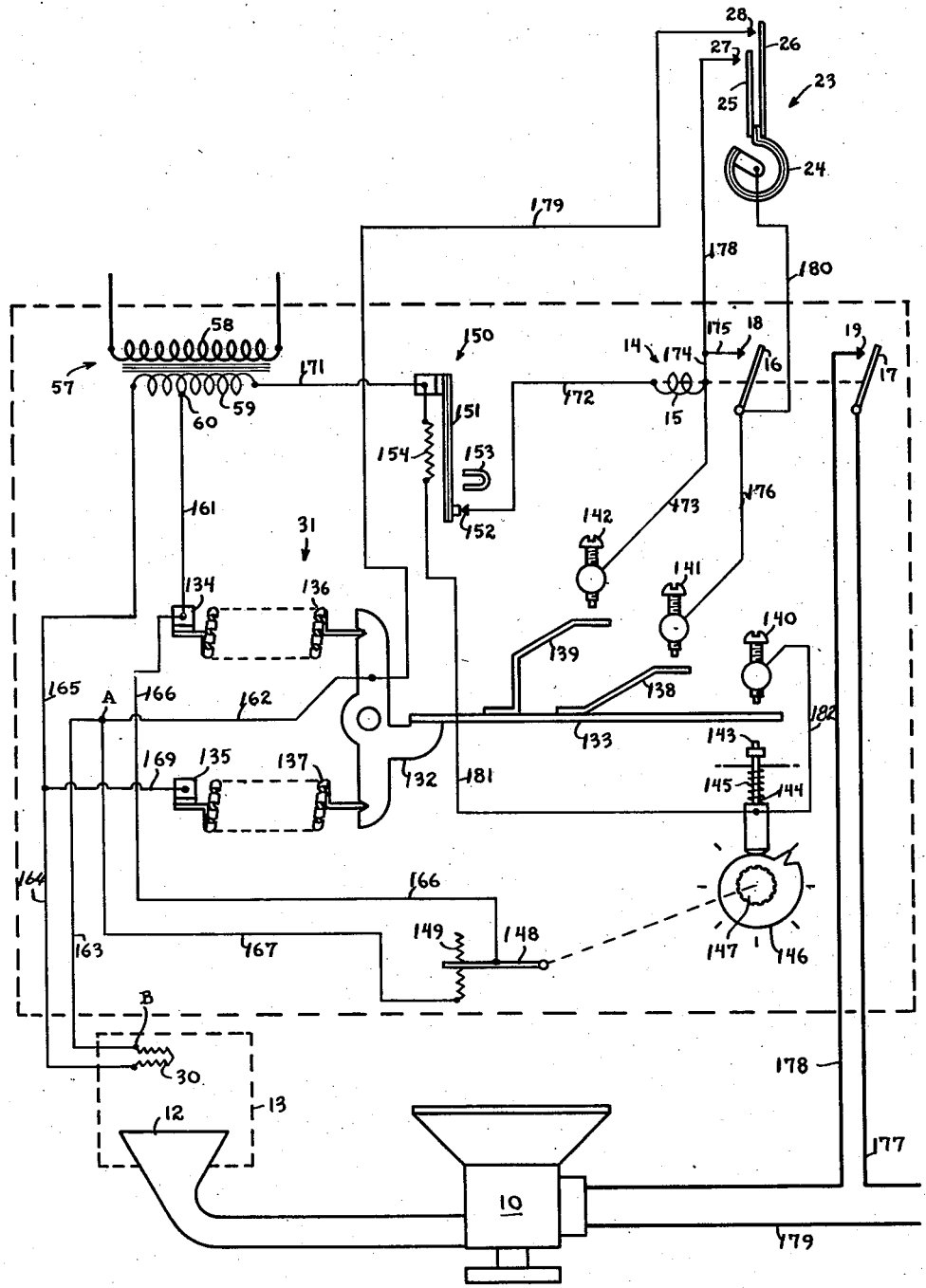
Figure 3 is a similar system embodying a third form of my invention.

Referring to Figure 3 of the drawings, I have shown a third preferred form of the invention utilizing somewhat different arrangements. Like numerals designate like elements in Figures 1, 2 and 3. In the present form of the invention the heat actuated device 31 comprises a pivoted member 132 having an extending arm 133. Secured between the ends of member 132 on opposite sides of its pivot and fixed bracket members 134 and 135 is a pair of similar heat responsive elements 136 and 137. Each of the elements 136 and 137 is formed of a bimetal element formed into a minor spiral or helix which minor helix is then formed into a larger helix as shown. This double helix arrangement results in linear motion of the elements upon a temperature change instead of rotary motion. The elements 136 and 137, as will presently be described, form legs of a bridge circuit and are so formed as to shorten when heated. The brackets 134 and 135 also form electrical terminals. The arm 133 forms a contact strip and it carries additional contact strips 138 and 139. The strip 133 cooperates with a contact screw 140 and the strips 138 and 139 cooperate with contact screws 141 and 142, respectively, the screws extending through fixed members as shown. Contact strip 133 also cooperates with a contact 143 carried on the end of a plunger 144, the plunger normally being urged away from the strip 133 by a coil spring 145 and into engagement with the surface of a cam 146. The cam 146 is rotatable by a manual knob 147 and attached to the shaft on which the cam is mounted is an arm 148 which forms a slider cooperating with an electrical resistance 149.

Numeral 150 designates a heat actuated switch comprising a bimetal element 151 cooperating with a fixed electrical contact 152 with which it is normally in engagement. Adjacent the bimetal element 151 is a permanent magnet 153 which in practice is made adjustable and arranged to cause the element 151 to engage with and disengage from the contact 152 with a snap action. Adjacent the element 151 is an electrical heating resistance 154.

Power for the control apparatus is supplied by a step-down transformer 57 having a primary winding 58 and a secondary winding 59, the secondary winding having a tap 60.

As described above, the elements 136 and 137 form legs of a bridge circuit. In the present circuit the resistance element 30 is in series with the element 136 and the resistance 149 is in series with the element 137. The circuit of element 136 is as follows: from the tap 60 on secondary winding 59 through wire 161, element 136, member 132, wire 162, wire 163, resistance element 30, wire 164, and wire 165 back to secondary 59. The circuit for the element 137 is as follows: from tap 60 through wire 161, wire 166, arm 148, resistance 149, wire 167, wire 162, member 132, element 137, wire 169, and wire 165 back to secondary 59. The resistance element 30 may be located at a more or less remote point from the elements 136 and 137 so that the wires 163 and 164 may form relatively long lead lengths in series with the element 136 introducing a relatively large amount of additional resistance in circuit with element 136. This additional resistance may undesirably affect the characteristics of the bridge circuit and to compensate for this additional resistance, that is, to balance it out the wire 167 may be connected to point B instead of point A so that corresponding lengths of wire will be in circuit with the element 137.

When the bridge circuit is balanced the parts may be substantially in the position shown, the currents in the legs of the bridge circuit being such as to cause the heating of each of the elements 136 and 137 to be such that the forces which they produce balance each other, maintaining the member 132 in a static condition. Unbalancing of the bridge circuit by variation in resistance of element 30 or adjustment of the arm 148 will vary the relative current flow through the elements 136 and 137 so as to change the relative heating of each so that either one or the other exerts a preponderating force on the member 132 tending to cause it to rotate one way or the other about its pivot.

With the parts in the position shown, the thermostat 23 is satisfied and therefore the stoker is not operating and the fire is diminishing. As the fire diminishes in size, the temperature in the combustion space 13 decreases correspondingly and the resistance of element 30 also decreases, it having a positive coefficient of resistance. When the temperature in combustion space 13 and correspondingly the resistance of element 30 decreases to a predetermined value, the relative current flow through element 136 and element 30 which is in series therewith increases so as to cause the heating of element 136 to preponderate over element 137. At the predetermined temperature value just mentioned, element 136 will have shortened sufficiently due to additional heating to cause member 132 to rotate in a counter-clockwise direction bringing contact strips 138 and 139 into engagement with their respective contact screws 141 and 142. The contact strips 138 and 139 are flexible and strip 138 engages screw 141 slightly before strip 139 engages screw 142. Strip 133 normally does not engage screw 140 but will engage screw 140 at a relatively low temperature in the combustion space 13, indicating that the fire is extinguished. The function of strip 133 and screw 140 will be presently described. When contact strip 139 engages screw 142, a circuit is completed for relay 14 as follows: from secondary 59 through wire 171, element 151, contact 152, wire 172, winding 15, wire 173, contact screw 142, strip 139, arm 133, member 132, element 137, wire 169, and wire 165 back to secondary 59. An addition circuit is completed for winding 15 which is the same as the circuit just described as far as member 132 but it then continues through element 136 and wire 161 back to secondary 59. It will be noted that in the low voltage bridge circuit through element 136 described above the current flow was from left to right as seen on Figure 3 and in the bridge circuit through element 137 the current flow was from right to left. It will be seen that in the relay circuits traced the current flow is from right to left in both of the elements 136 and 137. It will be seen therefore that the currents flows in the bridge circuit and in the relay circuit through element 137 are additive while these current flows through element 136 are in the opposite direction and tend to neutralize each other. Therefore, after the relay 14 has once been energized, due to the current flows through element 137 being additive, there will be increased heating of element 137 which will produce an anticipating effect tending to move member 132 in a clockwise direction sooner than it would be in response only to the increased temperature in the combustion space 13 resulting from stoker operation acting on resistance element 30. This anticipating effect corresponds to that produced in the modification of Figure 1 above. In the event of failure of element 30 due to burning out, the bridge circuit through element 136 would be interrupted. Element 136 would thus cool and lengthen thereby causing arm 133 to be moved in a clockwise direction toward contact 143, the apparatus thus failing safe.

When the relay 14 is energized, switch blades 16 and 17 are moved to the left into engagement with their respective contacts. Engagement of blade 16 with contact 18 produces a maintaining circuit for relay 14 as follows: from secondary 59 through wire 171, element 151, contact 152, wire 172, winding 15, wire 174, wire 175, contact 18, blade 16, wire 176, screw 141, contact strip 138, arm 133, member 132, element 136, and wire 161 back to secondary 59. The maintaining circuit is also completed from secondary 59 through wire 171, element 151, contact 152, wire 172, winding 15, wire 174, wire 175, contact 18, blade 16, wire 176, screw 141, strip 138, arm 133, member 132, element 137, wire 169, and wire 165 back to secondary 59. Therefore, after the relay has been energized it will remain energized until member 132 is moved in a clockwise direction sufficiently to separate both strips 138 and 139 from screws 141 and 142. When blade 17 engages contact 19 a circuit is completed for the stoker as follows: from line conductor 177 through blade 17, contact 19, wire 178, the stoker 10 back to line conductor 179. The stoker continues in operation as long as the relay is energized.

As the stoker operates the temperature affecting element 30 increases, which increases its resistance tending to reduce the relative current flow through element 136, which reduces the heating of element 136. This tends to cause element 136 to lengthen so as to move member 132 in a clockwise direction so as to open the contacts associated therewith. When the temperature in the combustion space 13 has risen a predetermined amount which is of course modified by the anticipating effect caused by the additive current flows through element 137, strips 138 and 139 will be disengaged from their associated contact screws deenergizing the relay and stopping the stoker. The purpose of having the anticipating effect is the same as in the modification of Figure 1, that is, to hasten the stopping of the stoker after it has been started in response to the element 30 inasmuch as it might be that the apparatus would not otherwise respond soon enough to heating of the element 30 for stopping the stoker.

As has been explained in the foregoing, the element 30 will act to intermittently start and stop the stoker, maintaining a fire in the combustion space when there are no demands for heat from the space thermostat. Normally the stoker will be thus started and stopped at predetermined temperatures depending upon the bridge circuit and of the element 30. To adjust the temperature which will be maintained in the combustion space the bridge circuit characteristics may be varied by adjusting the knob 147 to move the arm 148 with respect to resistance 149. Thus if knob 147 is adjusted in a direction so as to reduce the part of resistance 149 which is in circuit with element 137, the relative current flow through element 137 and the heating thereof will tend to be increased so that it will tend to shorten, moving member 132 in a clockwise direction. Thus it follows that the resistance of element 30 will have to be reduced to a relatively lower value before the current flow therethrough, and the heating of element 136 will be increased sufficiently to cause it to move member 132 in a counter-clockwise direction enough to make strips 138 and 139 engage their associated contacts. In other words, adjustment of arm 148 in a counter-clockwise direction will lower the temperature which is maintained in the combustion space by the mechanism and movement of arm 148 in a clockwise direction will have the opposite effect.

The knob 147 has a normal setting which may be one to maintain a temperature of 200 degrees, for example. When the knob is at this setting, and if the temperature in the combustion space is substantially at a value corresponding to this setting, the portion of resistance 149 in circuit with element 137 is the same as the resistance of element 30; the resistance of elements 136 and 137 being the same, under these circumstances it will be seen that any variations in current at the power source will thus be compensated for, because, for the reasons just stated such variations will have the same effect on both of the elements 136 and 137.

The relay 14 may be energized for starting the stoker by the space thermostat 23 when the temperature falls sufficiently to cause both blades 25 and 26 to engage their respective associated contacts. This circuit is as follows: from secondary 59 through wire 171, element 151, contact 152, wire 172, winding 15, wire 174, wire 178, contact 27, blades 25 and 26, contact 28, wire 179, member 132, element 137, wire 169, and wire 165 back to secondary 59. When relay 14 is energized by this circuit, engagement of blade 16 with contact 18 completes a maintaining circuit as follows: from secondary 59 through wire 171, element 151, contact 152, wire 172, winding 15, wire 175, contact 18, blade 16, wire 180, element 24, blade 26, contact 28, wire 179, member 132, element 137, wire 169, and wire 165 back to secondary 59. The relay therefore remains energized until the space temperature rises to a high enough value to cause blade 26 to separate from contact 28. The stoker remains in operation as long as the relay remains energized in response to the space thermostat through a circuit which has already been described.

If during the time that the stoker is operating in response to the space thermostat the combustion space temperature should rise to an unduly high value, the relay may be deenergized in response to the element 30. Thus when the temperature in the combustion space 13 reaches a predetermined relatively high value, the resistance of element 30 will have increased to a relatively high value such as to so reduce the relative current flow therethrough and to reduce correspondingly the heating of element 136 so that due to its lengthening it preponderates over element 137, rotating member 132 in a clockwise direction bringing arm 133 into engagement with contact 143. Upon this occurring, a circuit is completed for heating resistance 154 as follows: from secondary 59 through wire 171, resistance 154, wire 181, plunger 144, contact 143, arm 133, member 132, element 137, wire 169, and wire 165 back to secondary 59. The heat from resistance element 154 causes the bimetal element 151 to warp to the left so as to disengage from contact 152 interrupting the relay circuits so as to deenergize the relay and stop the stoker. When the stoker has been stopped the combustion space temperature will begin to fall, thus tending to cause the resistance of element 30 to decrease again. If the thermostat 23 remains in a position calling for heat the reduction in temperature in the combustion space 13 may cause the relative heating of element 136 to increase again to an extent sufficient to cause movement of member 132 in a counter-clockwise direction moving arm 133 away from contact 143. This will de-energize heating resistance 154 permitting blade 151 to re-engage contact 152. If this occurs the thermostatic relay circuits will again be completed and the stoker will be restarted and in this manner the stoker may be cycled in response to the element 30. From the foregoing, it can be seen that the contact 143 constitutes a high limit contact for shutting down the system under high fire conditions.

As has previously been described, the position of contact 143 with respect to arm 133 is adjustable by means of the manually rotatable cam 146. It will be seen that adjustment of the knob 147 simultaneously adjusts the temperature which the apparatus will maintain in the combustion space and also adjusts the position of high limit contact 143. It will be understood that if the contact 143 were not adjustable, when the characteristics of the bridge circuit were adjusted by moving arm 148 to vary the temperature maintained in the combustion space, the varied characteristics of the bridge circuit would cause the high limit setting to be varied as well. It is desired that the high limit setting, that is, the temperature at which the system will be shut down under high fire conditions remain the same. Thus the contour of cam 146 is such that when knob 147 is adjusted, the position of contact 143 will be adjusted to just compensate for the variation in the bridge circuit characteristics occasioned by movement of arm 148 in a manner to maintain the high fire shut-down setting constant. In other words, when arm 148 is moved in a counter-clockwise direction so as to lower the fire maintaining setting as described above, it tends to cause element 137 to shorten and move arm 133 towards contact 143. Thus this would tend to lower the high fire shutdown setting as well because less lengthening of element 136 would then be required to bring arm 133 into engagement with contact 143. So when knob 147 is turned in a counter-clockwise direction to move arm 148 downwardly along resistance 149, cam 146 acts to move contact 143 downwardly a corresponding amount to maintain the high fire shutdown setting constant. Clockwise rotation of knob 147 of course moves arm 148 and cam 146 oppositely.

In the event that the fire in the combustion space 13 should go out entirely or diminish to such an extent that it would not recover upon the addition of fresh fuel thereto, the resistance of element 30 will drop to such an extent that the increased heating and resulting shortening of element 136 will bring arm 133 into engagement with contact screw 140 after strips 138 and 139 have engaged their respective contact screws. Arm 133 will engage screw 140 at a predetermined relatively low temperature in the combustion space 13 and when it does so a circuit will be completed for heating resistance 154 as follows: from secondary 59 through wire 171, resistance 154, wire 181, wire 182, contact screw 140, arm 133, member 132, element 137, wire 169, and wire 165 back to secondary 59. Energization of heating resistance 154 will heat bimetal element 151 which will flex out of engagement with contact 152 interrupting the relay circuits and shutting down the stoker as described above.

After the stoker has been thus shut down, the combustion space will continue to cool and arm 133 will be held more firmly in engagement with contact screw 140 so that the relay cannot be re-energized until fire has been reestablished in the combustion space.

From the foregoing, those skilled in the art will appreciate that in the present form of the invention I have applied its principles in a novel manner. The present embodiment has the advantages ascribed to the previous modifications and has the additional advantages inherent in bridge circuit arrangements. The arrangement provides all of the necessary functions with appropriate and convenient adjustments.

It is to be understood that a bridge circuit similar to the one disclosed in Figure 3 might be used in combination with the heat actuated devices of the embodiments of Figures 1 and 2. It is also to be understood that it is within the realm of my invention to utilize temperature responsive resistance elements having a negative coefficient of resistance. If such an element were used, for instance in the form of Figure 3, it would be in that leg of the bridge circuit now occupied by the manually adjustable resistance.

The forms of my invention which I have disclosed are preferred forms and are understood to be exemplary. There are many forms and modifications which may be made by those skilled in the art and therefore the invention is not to be limited by my disclosure but only in accordance with the appended claims.

I claim as my invention:

1. In a control system, in combination, a combustion chamber, an automatic stoker for feeding fuel to the chamber, control means comprising a thermal relay for controlling the stoker, means comprising a temperature responsive resistance element exposed to heat in the combustion chamber, the resistance of said element varying as its temperature varies, said element being associated with said relay to control its operation, said thermal relay and said element being so related as to start said stoker when the temperature in the combustion chamber is relatively low, space temperature responsive means controlling said stoker, a heater associated with said thermal relay and controlled by said space temperature responsive means for heating the relay to raise its control point during demands for heat whereby after the space temperature responsive means are satisfied the thermal relay acts in response to said element to intermittently operate said stoker while the combustion chamber temperature is falling, said heating means cooling during such time allowing the thermal relay to gradually assume its normal control point.

2. In a system of the class described, in combination, an automatic stoker, a combustion chamber containing fuel fed by the stoker, control apparatus for the stoker comprising an element responsive to heat within the combustion chamber, said element carrying an electric current and being of such a nature that its resistance to current flow varies with temperature, means forming a bridge circuit having said element in one of its legs, said circuit having other legs the relative energization of which is dependent on said element and electrical contacting means controlling the stoker operable in response to the relative energization of said other legs, said other legs including expansible and contractible current carrying elements associated with said contacting means for actuating same.

3. In a system of the class described in combination, an automatic stoker, a combustion chamber containing fuel fed by the stoker, control apparatus for the stoker comprising an element responsive to heat within the combustion chamber, said element carrying an electric current and being of such a nature that its resistance to current flow varies with temperature, means forming a bridge circuit having said element in one of its legs, said circuit having other legs the relative energization of which is dependent on said element, electrical contacting means controlling the stoker operable in response to the relative energization of said other legs, and means whereby upon closure of said contacting means circuit means are completed whereby the relative energization of said other legs is varied so as to tend to open said contacting means.

4. In a system of the class described, in combination, an automatic stoker, a combustion chamber containing fuel fed by the stoker, control apparatus for the stoker comprising an element responsive to heat within the combustion chamber, said element carrying an electric current and being of such a nature that its resistance to current flow varies with temperature, means forming a bridge circuit having said element in one of its legs, said circuit having other legs the relative energization of which is dependent on said element, electrical contacting means controlling the stoker operable in response to the relative energization of said other legs, variable resistance means controlling the relative energization of said other legs to adjust the temperature at which said element brings about actuation of said contacting means to start the stoker, a thermostat controlling the stoker, means including an adjustable contact whereby said contacting means control the stoker so as to stop it in response to a high temperature affecting said element, and means for simultaneously adjusting said variable resistance and said adjustable contact, said adjusting means for the adjustable contact and variable resistance being so constructed and arranged that when the variable resistance is adjusted to vary the temperature at which the element starts the stoker, the adjustable contact is adjusted so as to maintain substantially constant the high temperature value at which the stoker is stopped in response to said element.

5. In apparatus of the character described, in combination, an automatic stoker, a combustion chamber containing fuel fed by the stoker, control apparatus for the stoker comprising an element responsive to heat within the combustion chamber, said element carrying an electric current and being of such a nature that its resistance to current flow varies with temperature, and means associated with said element responsive to the variations in current flow therethrough, said last means comprising a current carrying member adapted to generate heat when carrying current and being expansible and contractible dependently on the temperature resulting from said heat, and said last means being arranged to start and stop the stoker.

6. In apparatus of the character described, in combination, an automatic stoker, a combustion chamber containing fuel fed by the stoker, control apparatus for the stoker comprising an element responsive to heat within the combustion chamber, said element carrying an electric current and being of such a nature that its resistance to current flow varies with temperature, and means associated with said element responsive to the variations in current flow therethrough, said last means comprising a pair of current carrying members adapted to generate heat when carrying current and being expansible and contractible dependently on the temperature resulting from said heat, said element being arranged to vary the relative current flows in said members and said members responding to said element to start and stop the stoker.

7. In a stoker of the class described, in combination, an automatic stoker, a combustion chamber containing fuel fed by the stoker, control apparatus for the stoker comprising an element responsive to heat within the combustion chamber, said element carrying an electric current and being of such a nature that its resistance to current flow varies with temperature, means forming a bridge circuit having said element in one of its legs, said circuit having other legs, the relative energization of which is dependent on said element, and electrical contacting means controlling the stoker operable in response to the relative energization of said other legs, said other legs comprising current carrying elements adapted to generate heat when carrying current and expansible and contractible dependently on the temperature resulting from said heat.

8. In a system of the class described, in combination, an automatic stoker, a combustion chamber containing fuel fed by the stoker, control apparatus for the stoker comprising an element responsive to heat within the combustion chamber, said element carrying an electric current and being of such a nature that its resistance to current flow varies with temperature, means associated with said element responsive to the variations in current flow therethrough for normally starting the stoker at a relatively low temperature in the combustion chamber and for stopping the stoker after a relatively small rise in temperature, space thermostatic means controlling the stoker, and means associated with said element for stopping the stoker upon occurrence of a relatively low temperature in the combustion chamber indicating that the fire has gone out, said last means comprising a thermally actuated switch operable in response to said element.

9. In a control system, in combination, a combustion chamber, an automatic stoker for feeding fuel to the chamber, control means comprising a thermal relay for controlling the stoker, means comprising a temperature responsive resistance element exposed to heat in the combustion chamber, the resistance of said element varying as its temperature varies, said element being associated with said relay to control its operation, said thermal relay and said element being so related as to start said stoker when the temperature in the combustion chamber is relatively low, and means controlled by said thermal relay and controlling its operation so as to cause the thermal relay to stop the stoker after it has been started sooner than it would normally be stopped in response to the resistance element, said last means comprising a device for varying the heating of the thermal relay.

10. In a system of the class described, in combination, an automatic stoker, a combustion chamber containing fuel fed by the stoker, control apparatus for the stoker comprising an element responsive to heat within the combustion chamber, said element carrying an electric current and being of such a nature that its resistance to current flow varies with temperature, means associated with said element responsive to the variations in current flow therethrough, said last means controlling the stoker and comprising a heat responsive device the heating of which is dependent on the current flow through said element, space temperature responsive means controlling the stoker, and heating means controlled thereby associated with said first mentioned means for modifying the control of the stoker by said first means.

11. In a system of the class described, in combination, fuel feeding means, a combustion chamber containing fuel fed by said fuel feeding means; first control means for said fuel feeding means comprising an element responsive to heat within the combustion chamber, said element carrying an electric current and being of such a nature that its electrical impedance varies with temperature, current responsive relay means associated with said element and responsive to the variations in current flow therethrough, means operatively connecting said relay means to said fuel feeding means, and an adjustable resistance also associated with said relay means; said first control means being operative to control said fuel feeding means to maintain a predetermined temperature within the combustion chamber depending upon the setting of said adjustable resistance; means including a further condition responsive device for controlling said fuel feeding means independently of said heat responsive element; said first control means being operative when a predetermined limiting temperature exists in said combustion chamber to terminate operation of said fuel feeding means independently of said further condition responsive device; and means to cause said last named operation to take place at the same limiting temperature regardless of the setting of said adjustable resistance.

12. In a system of the class described, in combination, an automatic stoker, a combustion chamber containing fuel fed by the stoker; first control means for the stoker comprising an element responsive to heat within the combustion chamber, said element carrying an electric current and being of such a nature that its electrical impedance varies with temperature, current responsive relay means associated with said element and responsive to the variations in current flow therethrough, means operatively connecting said relay means to said stoker, and an adjustable resistance also associated with said relay means; said first control means being operative to control the stoker to maintain a predetermined temperature within the combustion chamber depending upon the setting of said adjustable resistance, means including a further condition responsive device for controlling said stoker independently of said heat responsive element; said first control means being operative when a predetermined limiting temperature exists in said combustion chamber to terminate operation of said stoker independently of said further condition responsive device; and means including a compensating resistance adjusted simultaneously with said adjustable resistance to cause said last named operation to take place at the same limiting temperature regardless of the setting of said adjustable resistance.

13. In a control system, a combustion chamber, fuel feeding means for feeding fuel to said chamber, an impedance element located in said combustion chamber and being of a nature such that its electrical impedance varies with temperature, relay means having a current sensitive element connected in series with said variable impedance element, said relay means being connected to said fuel feeding means and controlling the operation of the latter in accordance with the amount of current flowing through said impedance and said current sensitive element, said relay means and variable impedance element normally being operative to maintain a predetermined range of temperatures within the combustion chamber, and a space thermostatic switch associated with said relay means, and operative when the space temperature drops below a predetermined value to cause operation of said fuel feeding means even though the combustion chamber temperature is above said predetermined range of values, said variable impedance element and relay means being operative when the combustion chamber temperature exceeds a predetermined high limit value to terminate operation of said fuel feeding means independently of said space thermostatic switch.

14. In a control system, a combustion chamber, fuel feeding means for feeding fuel to said chamber, relay means controlling said fuel feeding means, said relay means including a thermal relay having a heater and a temperature sensitive element, an element responsive to combustion chamber temperatures for controlling the energization of the heater of said thermal relay normally to maintain a predetermined temperature within the combustion chamber, a space condition responsive switch controlling the energization of said relay means to cause operation of said fuel feeding means even though the combustion chamber temperature is above said predetermined value, a further heater associated with the temperature sensitive element of said thermal relay, and means for energizing said further heater in accordance with the frequency and extent of time said space condition responsive switch calls for delivery of fuel to vary the control point of said combustion temperature responsive element.

BERTRAM P. POND.